United States Patent
Narehood et al.

(10) Patent No.: US 9,932,843 B2
(45) Date of Patent: Apr. 3, 2018

(54) DOUBLE FLOW TURBINE HOUSING TURBOCHARGER

(75) Inventors: Abraham C. Narehood, Dobson, NC (US); Vahidin Alajbegovic, Arden, NC (US); John P. Watson, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 797 days.

(21) Appl. No.: 14/119,246

(22) PCT Filed: Jun. 8, 2012

(86) PCT No.: PCT/US2012/041445
§ 371 (c)(1),
(2), (4) Date: Nov. 21, 2013

(87) PCT Pub. No.: WO2012/170754
PCT Pub. Date: Dec. 13, 2012

(65) Prior Publication Data
US 2014/0093364 A1    Apr. 3, 2014

Related U.S. Application Data

(60) Provisional application No. 61/495,447, filed on Jun. 10, 2011, provisional application No. 61/553,346, filed on Oct. 31, 2011.

(51) Int. Cl.
*F01D 9/04* (2006.01)
*F01D 9/02* (2006.01)
(Continued)

(52) U.S. Cl.
CPC ............. *F01D 9/041* (2013.01); *F01D 9/026* (2013.01); *F01D 17/165* (2013.01);
(Continued)

(58) Field of Classification Search
CPC .......... F01D 9/045; F01D 9/026; F01D 17/00;
F01D 17/10; F01D 17/105; F01D 17/12;
F01D 17/14; F01D 17/146; F01D 17/165
See application file for complete search history.

(56) References Cited

U.S. PATENT DOCUMENTS 4,729,715 A     3/1988  Wilde
6,073,447 A *   6/2000  Kawakami .............. F01D 9/026
                                                      60/602
(Continued)

FOREIGN PATENT DOCUMENTS

CN        1394254 A      1/2003
DE        3034271 A1     3/1981
(Continued)

OTHER PUBLICATIONS

Second Office Action for Chinese Patent Application No. 201280023273.7, dated Dec. 16, 2015, 23 pages.
(Continued)

*Primary Examiner* — Jason Shanske
*Assistant Examiner* — Cameron Corday
(74) *Attorney, Agent, or Firm* — Fish & Richardson P.C.

(57) ABSTRACT

Implementations of the present disclosure are directed to turbine assemblies for turbocharger systems. In some implementations, turbine housings include a body that defines an inlet for fluid communication with a fluid source, and a wall, the wall dividing the inlet into an inner inlet and an outer inlet, and a fluid guide assembly disposed within the housing, the fluid guide assembly including a plurality of vanes that demarcate an inner volute and an outer volute within the housing, the inner volute being in fluid communication with the inner inlet and the outer volute being in fluid communication with the outer inlet, each vane of the plurality of vanes being fixed at a respective angle relative to a radial
(Continued)

direction, the plurality of vanes guiding fluid flow from the outer volute to the inner volute.

18 Claims, 12 Drawing Sheets

(51) Int. Cl.
*F01D 17/16* (2006.01)
*F02C 6/12* (2006.01)
*F02B 37/02* (2006.01)
*F02B 37/24* (2006.01)

(52) U.S. Cl.
CPC ............ *F02B 37/025* (2013.01); *F02B 37/24* (2013.01); *F02C 6/12* (2013.01); F05D 2220/40 (2013.01); F05D 2250/51 (2013.01); Y02T 10/144 (2013.01); Y10T 29/4932 (2015.01)

(56) References Cited

U.S. PATENT DOCUMENTS

| | | | | |
|---|---|---|---|---|
| 7,694,518 | B2* | 4/2010 | Whiting | F01D 9/026 415/116 |
| 8,226,358 | B2* | 7/2012 | Matsuo | F01D 9/026 415/151 |
| 2009/0220335 | A1* | 9/2009 | Matsuo | F01D 9/026 415/164 |
| 2010/0104425 | A1* | 4/2010 | Tries | F01D 9/045 415/160 |
| 2011/0296835 | A1 | 12/2011 | Ebisu | |
| 2012/0023936 | A1* | 2/2012 | Kruiswyk | F01D 9/045 60/605.2 |

FOREIGN PATENT DOCUMENTS

| | | |
|---|---|---|
| DE | 3034271 C2 | 11/1982 |
| DE | 19717559 C2 | 2/2002 |
| DE | 10112552 C2 | 1/2003 |
| DE | 102007017775 A1 | 10/2008 |
| DE | 102007017826 A1 | 11/2008 |
| EP | 119323 B1 | 5/1986 |
| EP | 86466 B1 | 5/1987 |
| EP | 212834 B1 | 11/1990 |
| EP | 1462628 B1 | 7/2006 |
| EP | 2025871 B1 | 7/2012 |
| JP | 57024402 B | 5/1982 |
| JP | 57024403 B | 5/1982 |
| JP | 62282122 A | 12/1987 |
| JP | 63143327 A | 6/1988 |
| JP | 63147903 A | 6/1988 |
| JP | 1012007 A | 1/1989 |
| JP | 1078204 A | 3/1989 |
| JP | 1267302 A | 10/1989 |
| JP | 6050164 B | 2/1994 |
| JP | 7025249 A | 1/1995 |
| JP | 10008977 A | 1/1998 |
| JP | 11336554 A | 12/1999 |
| JP | 2000213359 A | 8/2000 |
| JP | 2001263080 A | 9/2001 |
| JP | 2002070568 A | 3/2002 |
| JP | 2002138845 A | 5/2002 |
| JP | 2002155754 A | 5/2002 |
| JP | 2003035151 A | 2/2003 |
| JP | 2003322025 A | 11/2003 |
| JP | 2006291782 A | 10/2006 |
| JP | 2010203261 A | 9/2010 |
| WO | WO2012170754 A1 | 12/2012 |

OTHER PUBLICATIONS

Authorized Officer Athina Nickitas-Etienne, Notification Concerning Transmittal of International Preliminary Report on Patentability for International Application No. PCT/US2012/041445, dated Dec. 27, 2013, 7 pages.
Authorized Officer Taek Sang Lee, Notification of Transmittal of the International Search Report and the Written Opinion for International Application No. PCT/US2012/041445, dated Nov. 20, 2012, 10 pages.
N. Watson et al., Turbocharging the Internal Combustion Engine, John Wiley & Sons, Inc., New York, Sep. 1982; pp. 52-72; 147-157.
J. Kawaguchi et al., "Development of VFT (Variable Flow Turbocharger)," The Engineering Society for Advancing Mobility Land Sea Air and Space International, SAE Technical Paper Series 1999-01-1242, International Congress and Exposition, Detroit Michigan, Mar. 1-4, 1999, 8 pages.
Hiromitsu Ishihara et al., "Development of VFT Part 2," The Engineering Society for Advancing Mobility Land Sea Air and Space International, SAE Technical Paper Series 2002-01-2165, International Body Engineering Conference & Exhibition and Automotive & Transportation Technology Conference, Paris, France, Jul. 9-11, 2002, 8 pages.
K. Zinner, Aufladung von Verbrennungs-mooren, Springer-Verlag, Germany, 1980, pp. 94-95, including English translation thereof (4 pages).
Hans-Peter Schmalzl, "Aufladung von Pkw Dl—Ottomotoren mit Abgasturboladern mit variable Turbinengeometrie," Technical University of Dresden, Dresden, Germany, May 2006, pp. 49, 50 and 164-188, including English translation thereof (27 pages).
Examiner Suo Yan, First Office Action for Chinese Patent Application No. 201280023273.7, dated May 6, 2015, 19 pages.
Examiner Suo Yan, Third Office Action for Chinese Patent Application No. 201280023273.7, dated May 31, 2016, 25 pages.
Examiner Suo Yan, Fourth Office Action for Chinese Patent Application No. 201280023273.7, dated Nov. 30, 2016, 21 pages.

* cited by examiner

DOUBLE FLOW TURBINE HOUSING TURBOCHARGER

FIELD

The present invention relates to turbocharging, and more particularly to double flow turbines for turbochargers.

BACKGROUND

Turbochargers typically include a turbine coupled to a first end of a mounted, rotatable shaft and a compressor coupled to a second end of the shaft. The compressor generally includes a compressor wheel enclosed by a compressor housing and the turbine generally includes a turbine wheel enclosed by a turbine housing. During use, exhaust gases produced by an internal combustion engine are used to drive the turbine wheel which, in turn, powers the compressor wheel. The compressor increases the pressure of the air entering the engine, so that a greater amount of oxygen can be provided for combustion than is generally possible with a naturally aspirated engine (this effect can be especially advantageous for diesel engines which often require an air-fuel ratio in excess of the stoichiometric limit for clean combustion). This increase in pressure provided by the compressor is commonly referred to as "boost".

Turbines include turbine housings that are designed to contain the turbine wheel and to introduce a flow of exhaust gas to the turbine wheel. In some cases of high load (e.g., high engine speeds), if left unchecked, the energy of the flowing exhaust gas provided to the turbine wheel forces the compressor to produce more boost than the engine can safely withstand. This condition is termed "over-boost".

Over-boost has traditionally been inhibited by providing an exhaust bypass or "wastegate." The wastegate is designed to limit the energy provided to the turbine wheel by diverting a portion of the flowing exhaust gas away from the turbine (i.e., wastegating). Turbochargers provided with a wastegate, however, are usually sized for a low flow condition (e.g., a condition of low load or engine speed), requiring significant wastegating at or near rated power. Wastegating at rated power often results in poor fuel economy since the loss in mass flow throughput must be offset by an increase in expansion ratio across the turbine. As a result, the pressure upstream of the turbine rises, which leads to increased pumping losses for the engine.

Recently, variable turbine geometry (VTG) has been used to inhibit over-boost (VTG can also be used to create the adverse pressure gradient necessary to drive exhaust gas back to the intake manifold, a diesel emissions strategy referred to as "EGR"). VTG uses a set of movable vanes disposed in the turbine housing to control boost by altering the geometry of the turbine housing's internal space, thereby adjusting the pressure of the flowing exhaust gas introduced to the turbine wheel. While effective, VTG is often very complex and requires intricate control systems. The number of small moving parts, sensors, and controllers make them more expensive and more difficult to maintain than other turbochargers.

Improvements are continually sought for more efficient, cost effective, and adaptive turbochargers that provide sufficient boost control for both low and high load conditions.

SUMMARY

In some aspects, implementations of the present invention include a turbine housing for a turbocharger. In some implementations, a turbine housing includes a body that defines an inlet for fluid communication with a fluid source, and a wall, the wall dividing the inlet into an inner inlet and an outer inlet, and a fluid guide assembly disposed within the housing, the fluid guide assembly including a plurality of vanes that demarcate an inner volute and an outer volute within the housing, the inner volute being in fluid communication with the inner inlet and the outer volute being in fluid communication with the outer inlet, each vane of the plurality of vanes being fixed at a respective angle relative to a radial direction, the plurality of vanes guiding fluid flow from the outer volute to the inner volute.

In some aspects, the fluid guide assembly further includes a guide plate that is secured to the body. In some aspects, the vanes are each secured to the guide plate. In some aspects, the vanes are each integrally formed with the guide plate.

In some aspects, at least one of the vanes is positioned at a selected angle relative to the radial center of the turbine wheel. In some aspects, the selected angle is between approximately 30° and approximately 80°. In some aspects, the selected angle is between approximately 40° and approximately 70°. In some aspects, the selected angle is between approximately 50° and 60°. In some aspects, each of the vanes is positioned at the selected angle. In some aspects, the selected angle includes a first selected angle, and at least one other vane is positioned at a second selected angle relative to the radial center of the turbine wheel. In some aspects, the selected angle is measured from a radial line that runs through a center point of a turbine wheel opening and a center point of the vane, and a line that runs through the center point of the vane and a trailing edge of the vane.

In some aspects, the vanes are positioned to provide an angle of incidence of fluid flow relative to a turbine wheel. In some aspects, the angle of incidence is at most approximately 10°.

In some aspects, the respective angle of each vane is provided to inhibit fluid flow separation across the vane.

In some aspects, at least one of the vanes comprises a non-symmetrical airfoil shaped vane.

In some aspects, the inlet includes an inner fluid passage and an outer fluid passage, and the inner fluid passage is in fluid communication with the inner volute.

In some aspects, the housing further includes a valve assembly for regulating fluid communication between the outer inlet and the outer volute, the valve assembly including a gate that is movable between a fully closed position to inhibit fluid flow through the outer inlet, and a fully opened position to enable fluid flow through the outer inlet. In some aspects, the respective angle of the vanes is approximately 60°, as measured from a radial line that runs through a center point of a turbine wheel opening and a center point of the vane, and a line that runs through the center point of the vane and a trailing edge of the vane, and the gate is positioned at 80% open to provide a peak efficiency of the turbocharger. In some aspects, the respective angle of the vanes is approximately 55°, as measured from a radial line that runs through a center point of a turbine wheel opening and a center point of the vane, and a line that runs through the center point of the vane and a trailing edge of the vane, and the gate is positioned at 80% open to provide a peak efficiency of the turbocharger. In some aspects, the respective angle of the vanes is approximately 50°, as measured from a radial line that runs through a center point of a turbine wheel opening and a center point of the vane, and a line that runs through the center point of the vane and a trailing edge of the vane, and the gate is positioned at approximately 100% open to provide a peak efficiency of the turbocharger.

In some aspects, a turbocharger includes implementations of a housing as disclosed herein.

In some aspects, implementations of a method of manufacturing a turbocharger housing are provided. In some aspects, a method includes forming the body, the body defining an inlet for fluid communication with a fluid source, and a wall, the wall dividing the inlet into an inner inlet and an outer inlet, assembling the fluid guide assembly, the fluid guide assembly comprising the plurality of vanes that are each fixed at a respective angle relative to a radial direction, and securing the fluid guide assembly within the body such that the plurality of vanes demarcate an inner volute and an outer volute within the housing, the inner volute being in fluid communication with the inner inlet and the outer volute being in fluid communication with the outer inlet, the plurality of vanes being operable to guide fluid flow from the outer volute to the inner volute.

The details of one or more implementations of the present invention are set forth in the accompanying drawings and the description below. Other features and advantages of the present invention will be apparent from the description and drawings, and from the claims.

DESCRIPTION OF DRAWINGS

Like reference symbols in the various drawings indicate like elements.

DETAILED DESCRIPTION

Implementations of the present invention are generally directed to turbine assemblies for turbocharger systems including a dual-volute arrangement for selectively providing multiple fluid flow paths for driving a turbine wheel. In particular, implementations of the present disclosure include a plurality of guide vanes that are disposed within a turbine housing to demarcate an inner volute and an outer volute. The guide vanes direct fluid flow from the outer volute to the inner volute, and ultimately to the turbine wheel. In some implementations, the guide vanes are designed and positioned to provide a desired angle of incidence at the turbine wheel, to inhibit fluid flow separation across the guide vanes and/or to provide a desired throttle area between the guide vanes.

Figure 1:
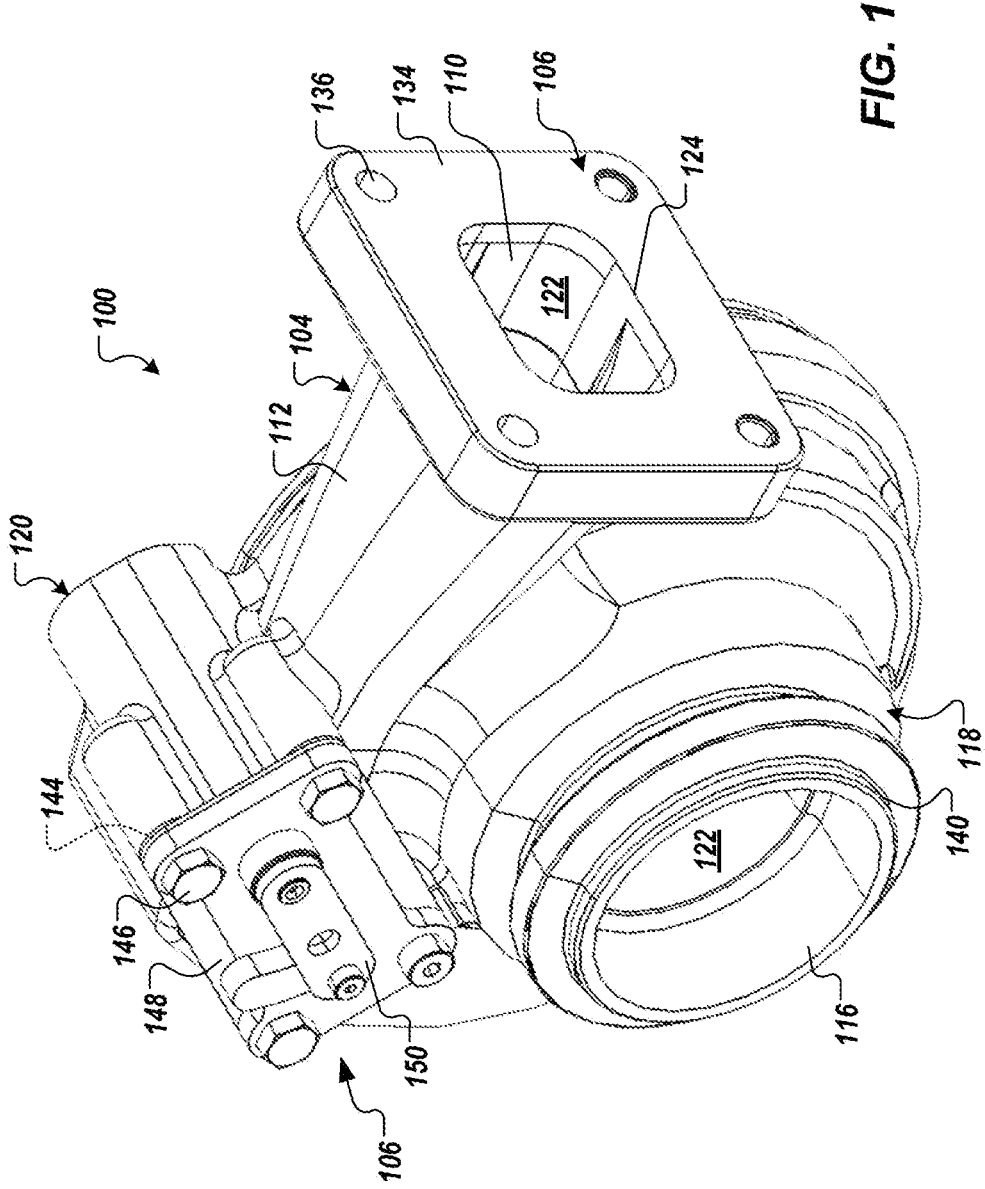
FIG. 1 is a perspective view of an example turbine assembly for turbocharger systems.
Figure 2:
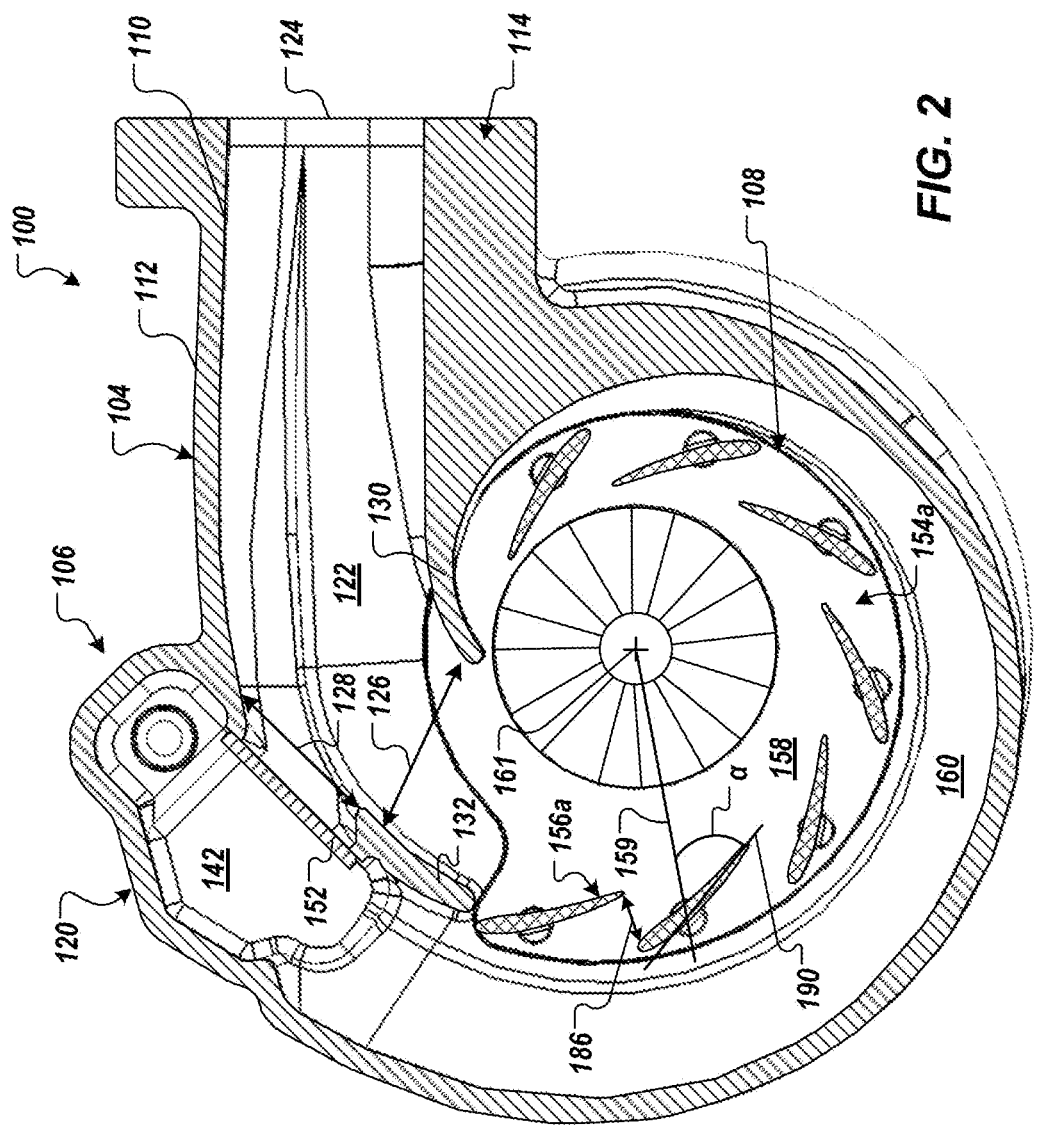
FIG. 2 is a cross-sectional view of the example turbine assembly of FIG. 1.

FIG. 1 is a perspective view of an example turbine assembly 100, and FIG. 2 is a cross-sectional view of the example turbine assembly 100. The turbine assembly 100 can be a component of a turbocharger system or a turbocharger kit. For example, the turbine assembly 100 can provide a suitable enclosure for a turbine wheel 102 (depicted schematically in FIG. 2). As used herein, a component can be provided as a single component or a combination of components coupled to one another having various regular or irregular shapes. In the example of FIGS. 1 and 2, the turbine assembly 100 is configured to guide a flow of pressurized fluid (e.g., combustion engine exhaust products) toward the turbine wheel 102. More particularly, the turbine assembly 100 includes one or more physical features (e.g., surfaces, members, structures, etc.), described in further detail below, which are formed, positioned and/or arranged such that to guide a flow of pressurized fluid entering the housing toward the turbine wheel 102. The fluid can include a liquid, gas, vapor, and/or any mixtures or combinations thereof.

The turbine assembly 100 includes a body 104 supporting both an inlet valve assembly 106 and a guide assembly 108. During use, the body 104 is coupled to a fluid source (e.g., an exhaust manifold coupled to an engine) that provides the flow of pressurized fluid. The body 104 can be coupled to the fluid source by a direct connection or an indirect connection (e.g., one or more intervening connections) between one or more objects or components. As the flow of pressurized fluid enters into an internal space of the body 104, the inlet valve assembly 106 regulates the fluid flow through one or more portions of an inlet. The guide assembly 108 guides the flow of pressurized fluid from the inlet toward turbine wheel 102.

In some implementations, the body 104 can have various regular or irregular shapes. For example, portions of the body 104 can be straight, curved, or a combination of both. Accordingly, the body 104 can be provided having any suitable shape or size. For example, as shown, the body 104 is irregularly shaped including both substantially straight and curved surfaces. Additionally, in this example, the body 104 is suitably sized for being disposed within an engine cavity of a motor vehicle. The body 104 includes an inner surface 110 and an outer surface 112 that define one or more portions of the body 104. In general, the body 104 can be composed of a substance including one or more materials that are largely chemically inert to typical exhaust products of a combustion engine.

In some implementations, the inner surface 110 and/or the outer surface 112 can include a coating that is largely chemically inert to typical exhaust products of a combustion engine. In some implementations, the inner surface 110 and the outer surface 112 include one or more roughened and/or substantially smooth portions. For instance, the inner surface 110 can include one or more smooth portions so as to limit any frictional pressure losses (e.g., head losses) experienced by the pressurized fluid flowing through the internal space of the body 104. In some examples, the outer surface 112 includes one or more roughened portions for providing an increased cooling effect on the body 104. For instance, the roughened portions can promote turbulent flow in a cooling fluid (e.g., air, oil, etc.) flowing across the outer surface 112, thereby increasing the rate of heat transfer between the cooling fluid and the body 104.

As shown, the body 104 includes a fluid inlet 114, a fluid outlet 116, a coupling element 118, a valve compartment 120, and an internal space 122, the particulars of which are described below. In the illustrated example, the fluid inlet 114 enables the flow of pressurized fluid provided by the fluid source to enter into the body's internal space 122. For instance, the flow of pressurized fluid can pass through an opening 124 defined in the fluid inlet 114. The opening 124 can include a suitable shape (e.g., circular, elliptical, polygonal, or including a combination of straight and curved edges) and of appropriate size (e.g., area) to enable the flow of pressurized fluid to enter into the internal space 122 at a selected rate of flow.

The fluid inlet 114 divides to provide an inner inlet 126 and an outer inlet 128. The inner inlet 126 is delimited by the outer surface of an inner wall 130 and the inner surface of a dividing wall 132 (see FIG. 2). The outer inlet 128 is delimited by the outer surface of the dividing wall 132 and the inner surface 110. As shown, the inner inlet 126 is in fluid communication with an inner volute 158 of the body 104, and the outer inlet 128 is in selective fluid communication with an outer volute 160 of the body 104 by operation of the inlet valve assembly 106, as discussed in further detail below. Each of the inner volute 158 and the outer volute 160 can be provided as a spiral or twisted passageway, conduit, or casing for containing and guiding a flow of fluid. In the illustrated example, the inner inlet 126 in conjunction with the inner volute of the body 104 provides a primary path towards turbine wheel 102 for the flow of pressurized fluid. In addition to the primary path, the outer inlet 128, in conjunction with the outer volute 160, provides a supplemental path toward the turbine wheel 102 for the flow of pressurized fluid. As shown, the inner and outer surfaces that delimit the inner and outer inlets 126, 128 include a curvature matching the curvature of the inner volute 158 and the outer volute 160, thereby limiting head loss experienced by a pressurized fluid flowing toward the turbine wheel 102.

The fluid inlet 114 can be coupled or connected to the fluid source such that the fluid inlet 114 and the fluid source are placed in fluid communication with one another. The fluid inlet 114 further includes a flange 134 for connecting the fluid inlet 114 to the fluid source. The flange 134 includes apertures 136 that receive one or more mechanical fasteners (not shown) for connecting the fluid inlet 114 to the fluid source. The mechanical fasteners couple two or more elements together, and can include a bolt, a pin, a rivet, a wire, a welding and any combination of such elements.

The fluid outlet 116 enables the flow of fluid to exit the internal space 122 after driving the turbine wheel 102. For example, the exhausted flow of fluid can pass through an opening defined by the fluid outlet 116. The opening can include an appropriate shape (e.g., circular, elliptical, polygonal, or including a combination of straight and curved edges) and size to enable the exhausted flow of fluid to exit the internal space 122. As shown in FIG. 1, the coupling element 118 is provided as an axial protrusion. The coupling element 118 can include external features that can engage complementary features of an exhaust component. In some examples, the coupling element 118 is configured to retain one or more sealing elements (e.g., metal gaskets, o-ring gaskets, etc.) therearound for sealing to an exhaust component and inhibiting exhaust of the fluid flow to atmosphere.

As shown in FIG. 2, the valve compartment 120 defines an internal space 142 that includes a suitable shape and size for receiving one or more components of the inlet valve assembly 106. In the illustrated example, the internal space 142 is of sufficient size to enable the inlet valve assembly 106 to be actuated between a closed position and a fully opened position. An opened position can include any valve position that enables fluid flow through the outer inlet 128 and into the outer volute 160. The closed position includes a valve position where fluid flow through the outer inlet 128 is blocked. When the inlet valve 106 is in the closed position, the outer volute 160 is partitioned from the outer inlet 128, and fluid flow to the outer volute 160 is inhibited. When the inlet valve 106 is in an opened position, the outer volute 160 is in fluid communication with the outer inlet 128. The inlet valve 106 can be adjusted between the closed position and the fully opened position to regulate fluid flow through the outer inlet 128 from a minimum fluid flow to a maximum fluid flow. The valve compartment 120 includes a flange (not shown) having apertures 144 that receive one or more fasteners (not shown) for connecting and rotatably supporting the inlet valve 106 within the valve compartment 120, as discussed in further detail below.

The internal space 122 can include a suitable shape and size for receiving the turbine wheel 102 and the fluid guide assembly 108. In the illustrated example, the internal space 122 is also suitably shaped to augment the ability of the fluid guide assembly 108 to guide the flow of fluid from the fluid inlet 114 toward the turbine wheel 102. For example, and as shown in FIG. 2, the internal space 122 includes a scroll-shaped cross section leading toward the turbine wheel 102.

The inlet valve assembly 106 includes a base plate 148, a linkage 150, and a gate 152. The base plate 148 is fixedly coupled to the body 104 and provides a structural base for one or more other members of the inlet valve 106. In the illustrated example, the base plate 148 is assembled against the flange of the valve compartment 120 and is fixedly connected to the body 104 using mechanical fasteners 146 which are received by the apertures 144. The linkage 150 provides a mechanical link between the gate 152 and the base plate 148. For example, a first portion of the linkage 150 is coupled to base plate 148 and a second portion of the linkage 150 is coupled to the gate 152. In this example, the linkage 150 includes a shaft rotatably mounted to the base plate 148 (for example, via one or more bushings, bearings, etc.). One end of the gate 152 is coupled to the shaft, such that rotating the shaft imparts a hinging motion on the gate (see FIG. 2). The gate 152 serves as a structural means of fluid access to the outer volute 160 through the outer inlet 128. For instance, when the inlet valve 106 is in a closed position, the gate 152 is positioned across the outer inlet 128, thereby inhibiting or preventing fluid flow through the outer inlet 128. When the inlet valve 106 is adjusted to an opened position, the gate 152 moves away from the outer inlet 128 to enable fluid flow through the outer inlet 128 (see FIG. 2). The inlet valve 106 can be adjusted from the closed position to a plurality of opened positions. In one or more opened positions, fluid flow through the outer inlet 128 is at least partially inhibited; and in one or more other opened positions (e.g., a fully opened position), fluid flow through the outer inlet 128 is substantially uninhibited. Adjustment of inlet valve 106 can be affected by an actuator (not shown) operatively coupled to the linkage 150. The actuator can be operated by any appropriate source (e.g., mechanical linkage, electric current, hydraulic fluid pressure, and/or pneumatic pressure).

A position of the gate 152 can be provided in terms of percent open relative to a fully opened position (100% open) and a fully closed position (0% open). The position can include an infinite number of positions between the fully opened position (100% open) and the fully closed position (0% open). Example positions between the fully opened position (100% open) and the fully closed position (0% open) can include 20% open, 50% open and 80% open.

The inlet valve 106 regulates the flow of fluid through one or more portions of the fluid inlet 114 during use. More specifically, the inlet valve 106 is configured to selectively regulate the flow of fluid through the outer inlet 128. In the illustrated example, the inlet valve 106 is in the fully closed position (0% open), blocking fluid flow through the outer inlet 128. In some cases, it may be desirable to regulate the flowrate of the fluid impinging on the turbine wheel 102 (e.g., to prevent over-boost). The flowrate can be regulated by adjusting the inlet valve 106 to an opened position (e.g., >0% open), thereby lessening the overall restriction to flow provided by the body 104 by allowing a portion of the fluid to flow through a supplemental path provided by through the outer inlet 128. As a result, the pressure upstream of the turbine wheel 102 can be substantially reduced. This reduction in expansion ratio can lead to a reduction in work extraction by the turbine wheel 102, which limits the boost provided to the engine by the turbocharger. The flowrate can also be regulated by adjusting the inlet valve 106 from an opened position (e.g., 20% open, 50% open, etc.) to an at least partially closed position (i.e., any valve position that is less open than the previous valve position). Closing the inlet valve 106 can increase both flow restriction and turbine work extraction, leading to an increase in boost provided by the turbocharger.

Figure 3:
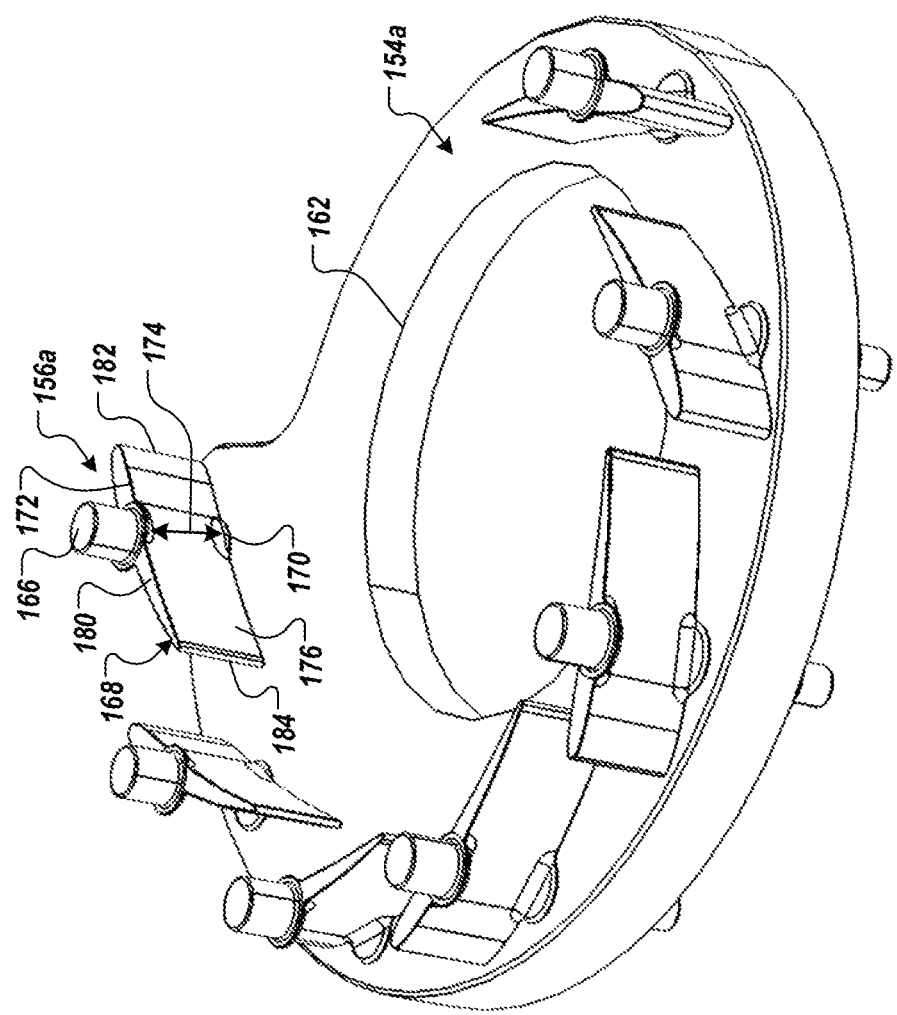
FIG. 3 is a perspective view of an example fluid guide assembly including guide vanes.
Figures 4A, 4B:
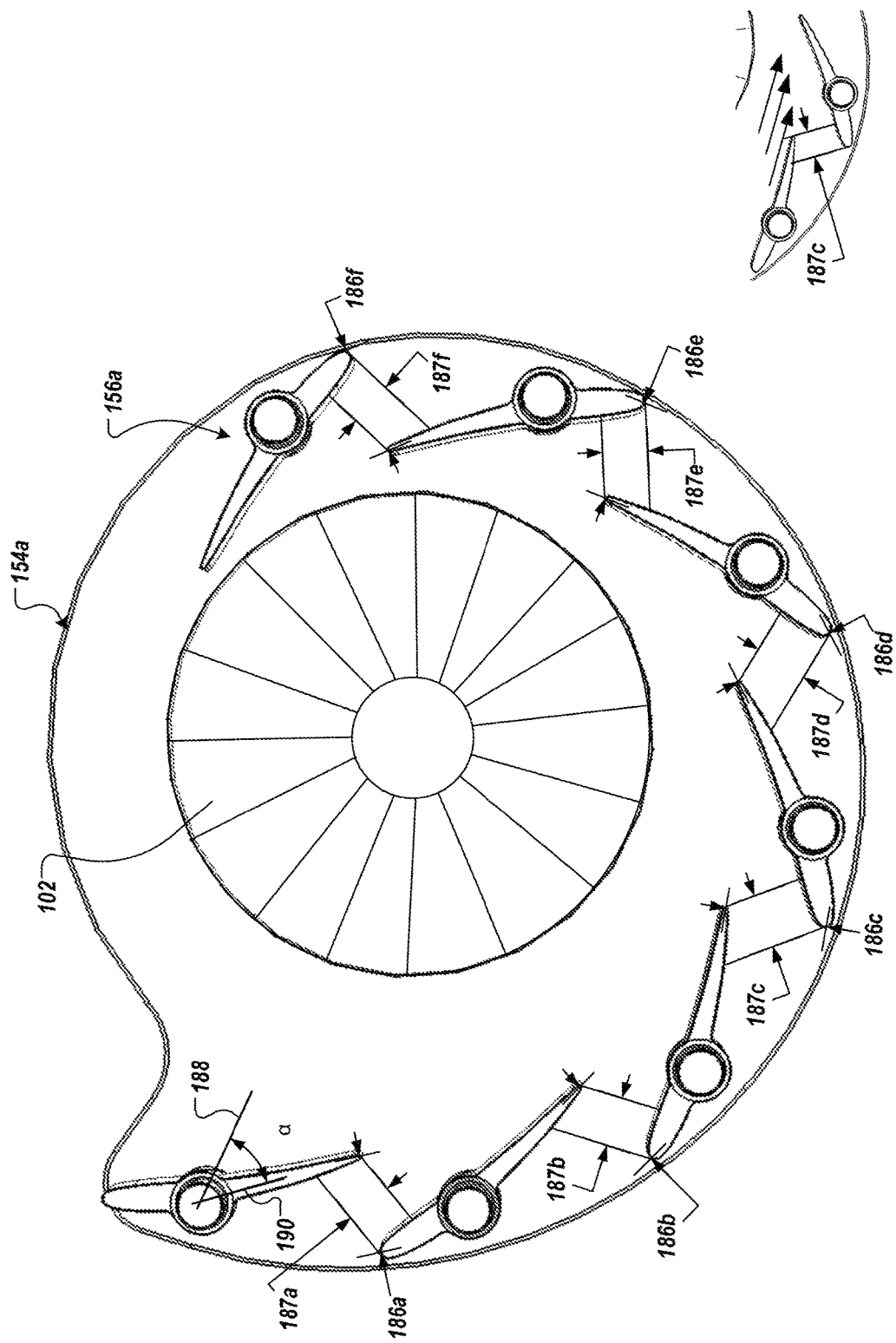
FIG. 4A is a plan view of the fluid guide assembly of FIG. 3 including the guide vanes.
FIG. 4B is a portion of the plan view of FIG. 4A showing fluid flow across guide vanes.

Referring now to FIGS. 3-4B, perspective and plan views of the fluid guide assembly 108 are provided. The fluid guide assembly 108 is configured to guide the flow of fluid from the fluid inlet 114 toward the turbine wheel 102. More specifically, the fluid guide assembly 108 includes one or more components, described in further detail below, that are formed, positioned, and/or arranged to guide fluid toward the turbine wheel 102. In the illustrated example, the fluid guide assembly 108 includes a guide plate 154a and a plurality of fluid guiding members provided as guide vanes 156a. The fluid guide assembly 108 is coupled to the body 104 such that the guide vanes 156a are disposed within the internal space 122. As shown in FIG. 2, the guide vanes 156a partition a portion of the internal space to define the inner volute 158 and the outer volute 160 (see FIG. 2).

Figure 5B:
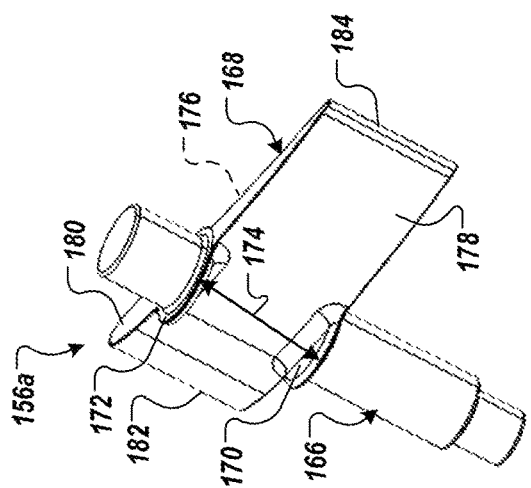
FIG. 5B is a perspective view of an example guide vane.
Figure 5A:
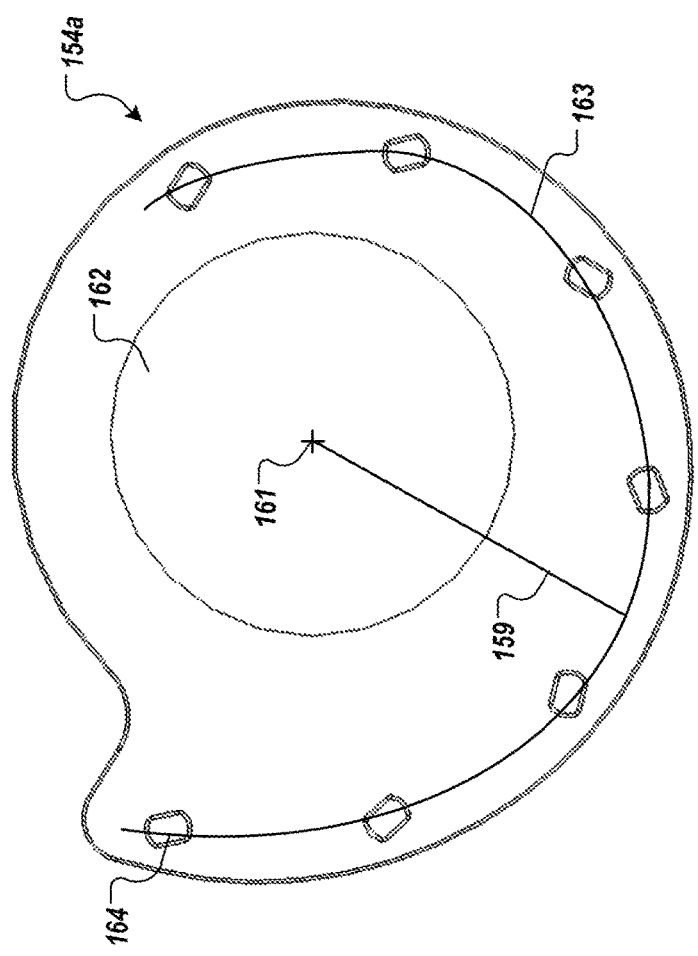
FIG. 5A is a plan view of the guide plate of FIG. 3 without the guide vanes.

FIG. 5A is a plan view of the guide plate 154a. The guide plate 154a can include a suitable shape and size for mounting and fixing the guide vanes 156a in a selected configuration. For example, and as depicted, the guide plate 154a is provided in the form of a curvilinear plate defining an opening 162 and keyways 164. As shown, opening 162 is circular and is of sufficient size to receive the turbine wheel 102. The keyways 164 receive portions of the guide vanes 156a such that the guide vanes 156a are rotatably fixed to the guide plate 154a in a selected orientation. In the illustrated example, the keyways 164 include non-circular openings for inhibiting rotational motion of the guide vanes 156a. The keyways 164 are arranged in the guide plate 154a askew from a radius 159 taken from a center 161 of the opening 162. That is, the keyways 164 are arranged along a spiral path 163 relative to the center 161 of the opening 162. Consequently, when the guide vanes 156a are fixed in the keyways 164, the guide vanes 156a are arranged askew from the radial direction, along the spiral path 163. As discussed in further detail herein, the selected orientation of the guide vanes 156a can include a selected angle with respect to the radius 159 from the center 161 of opening 162.

FIG. 5B is a perspective view of a guide vane 156a. The guide vane 156a includes a vane post 166 coupled to a vane body 168. The vane post 166 can be coupled to the vane body 168 by any known method (e.g., welding, adhesion, etc.). Alternatively, in some implementations, the vane posts 166 and the vane body 168 are formed as a single component (via casting, for example). The vane post 166 includes a suitable shape and size to be fixedly disposed in a keyway 164. In the illustrated example, the lower end of the vane post 166 is suitably shaped and sized to be press fit into a keyway 164. In some examples, the vane post is configured to withstand severe bending or shear stresses experienced due to the flow of fluid across the fluid bearing surfaces of the vane body 168. The vane post 166 includes an inner flange 170 and an outer flange 172 for distributing the load imparted on the vane post 166 by the vane body 168 during use. In some examples, a channel 174 is defined across the vane body 168 to provide an un-obstructed fluid path for the flow of fluid along a longitudinal direction of the vane body 168. In some implementations, the channel 174 is extended by side rails to inhibit leakage of pressurized fluid around the guide vane 156a.

With continued reference to FIG. 5B, the vane body 168 includes inner fluid bearing surface 176, outer fluid bearing surface 178, side surface 180, leading edge 182, and trailing edge 184. The geometry of the vane body 168 (e.g., the combination of thickness, camber, etc.) is provided to achieve particular fluid flow characteristics during use. For example, the vane body 168 can have a non-symmetrical airfoil shape to reduce parasitic losses in the fluid flow. Airfoil shaped guide vanes can also provide for a smooth merging of fluid flowing from the outer volute 160 to the inner volute 158, when the inlet valve 106 is in the opened position. Further, in the illustrated example, the geometry of the vane body 168 is provided to inhibit separation of the flow of fluid from both the inner and the outer fluid bearing surfaces 176, 178. In some implementations, the inner and outer fluid bearing surfaces 176, 178 include smooth surfaces to inhibit fluid flow separation.

Figure 6A:
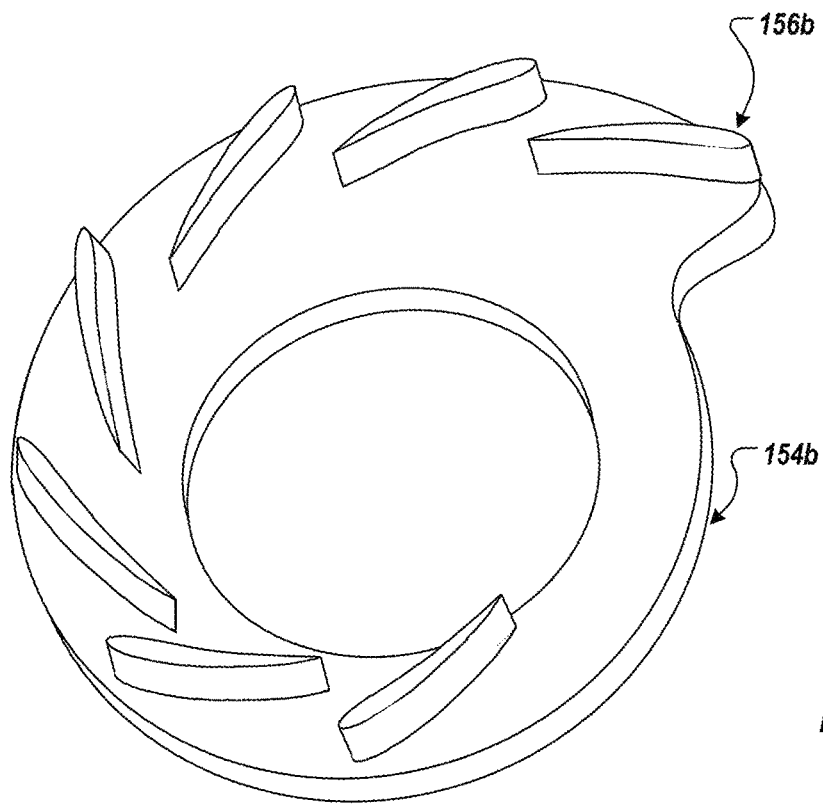
FIG. 6A is front perspective view of a second example guide plate including integrally formed guide vanes.
Figure 6B:
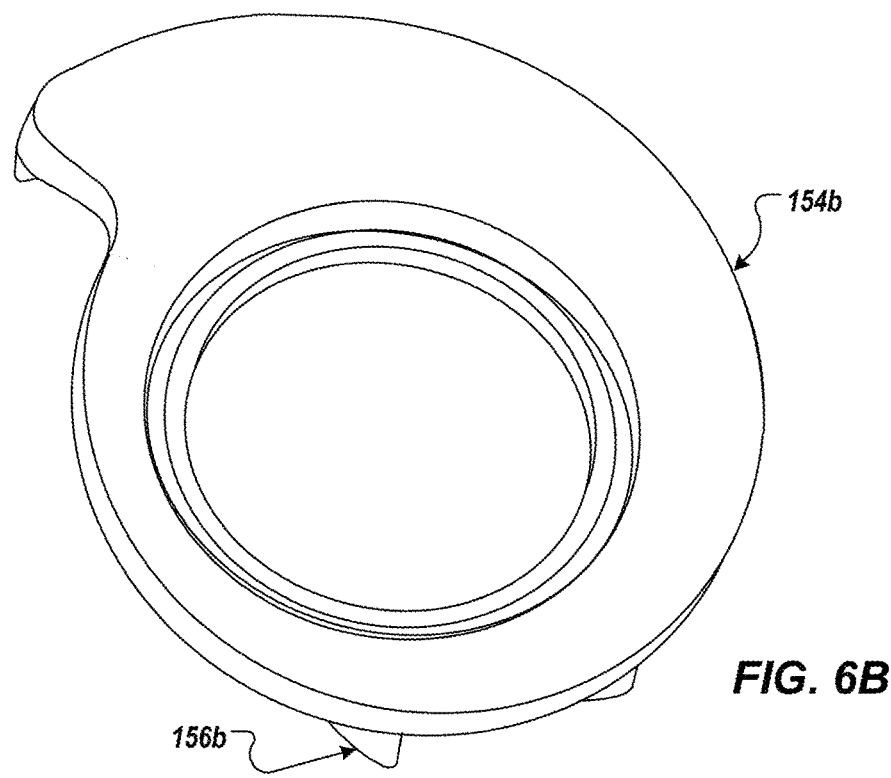
FIG. 6B is a rear perspective view of the guide plate of FIG. 6A.

As described above, and in some implementations, the guide vanes 156a can be formed as separate components from the guide plate 154a and can be subsequently coupled thereto. FIGS. 6A and 6B illustrate, however, that in some other examples, guide vanes 156b can be formed integrally with a guide plate 154b. That is, the guide plate 154b and the guide vanes 156b can be formed as a single component. As shown in FIGS. 6A and 6B, the guide plate 154b and the guide vanes 156b are configured similarly to the guide plate 154a and the guide vanes 156a. The guide vanes 156b can be similarly constructed to the guide vanes 156a and can include at least an inner fluid bearing surface, an outer fluid bearing surface, a leading edge, and a trailing edge. It may be advantageous to form the guide plate 154b and the guide vanes 156b as a single integral piece. For example, forming the guide plate and the guide vanes in this manner can inhibit or prevent structural failure by eliminating the joint between these components. As another example, manufacturing efficiency can be improved and cost can be reduced, because assembly of guide vanes onto the guide plate is foregone.

Particular features of the guide vanes and/or the arrangement of the guide vanes relative to one another, as well as fluid flow features are discussed below. In some instances, and by way of example, the guide vanes 156a are referenced. In some instances, and also by way of example, the guide vanes 156b are referenced. In some instances, and also by way of example, guide vanes 156c (FIGS. 8-12B) are referenced. It is appreciated, however, that the guide vane features and the fluid flow features are applicable to arrangement including the guide vanes 156a, the guide vanes 156b and/or the guide vanes 156c.

Referring again to FIGS. 2-4A, the guide vanes 156a partition a portion of the internal space 122 into the inner volute 158 and the outer volute 160. In the illustrated example, the guide vanes 156a are positioned in a scroll like formation (e.g., a logarithmic scroll). As shown, the guide vanes 156a are positioned such that respective throat areas 186a-186f (see FIG. 4A) are defined between the trailing edge 184 of guide vane 156a and the leading edge 182 of a following guide vane 156a. In some examples, the guide vanes 156a can be positioned such that a size of each of the throat areas 186a-186f is the same. In this manner, the turbine assembly 100 can be tuned based on engine operating conditions to achieve certain desired flow characteristics and/or efficiencies, as described in further detail below. The guide vanes 156a are arranged on the guide plate 154a askew from a radial direction 188 of the turbine wheel 102 (see FIGS. 2 and 4A). The radial direction 188 extends from the center point 161, or axis of rotation of the turbine wheel 102. The guide vanes 156a are arranged at a selected angle α with respect to the radial direction 188 and a center line 190 of the guide vane 156a. In the illustrated example, the center line 190 extends between a center point of the vane post 166 and the trailing edge 184. In some examples, each guide vane 156a is arranged at the same vane angle α as every other guide vane 156a. In other examples, each guide vane 156a is arranged at a respective vane angle α that can be different from vane angles of the other guide vanes 156a. The vane angle(s) α can be selected to achieve desired flow characteristics. For example, the vane angle(s) α can establish an angle of incidence for the fluid flow (as discussed in detail below) and/or establish the size of the throat areas 186a-f.

The guide vanes 156a can also be positioned to form respective overlap areas 187a-f. The overlap areas 187a-187f can define a length of the throat areas 186a-186f help constrain fluid flow to inner volute 158 by inhibiting (or even preventing) "crosstalk" between the inner and the outer volutes 158, 160. For example, as shown in FIG. 4B, the overlap areas 187a-187f can inhibit fluid flowing through inner volute 158 from passing through the throat area between vanes and into the outer volute 160.

The guide vanes 156a guide the flow of fluid to the turbine wheel 102 and provide desired fluid flow characteristics. The vane angle(s) α can be selected such that the flow of fluid is guided from the inner inlet 126 toward the turbine wheel 102 at a particular angle of incidence relative to the turbine wheel 102 (i.e., the angle at which the fluid contacts a face of a turbine blade). The angle of incidence can determine how efficiently a particular turbine wheel is driven by the pressurized flow of fluid. For instance, the design of the turbine wheel can determine an optimum angle of incidence. Therefore, in some examples, high turbine wheel efficiency can be achieved by selecting an appropriate vane angle to guide the flow of fluid to the turbine wheel at the optimum angle of incidence. In particular, a fluid flow having a lower angle of incidence will have a larger tangential component as compared to a fluid flow having a higher angle of incidence. When the guide vanes 156a are arranged at a higher vane angle α, the angle of incidence will be lower than when the vanes are arranged at a lower vane angle α.

Each vane angle α can provide an optimum angle of incidence, for a particular turbine wheel, under one or more operating conditions (some vane angles α can provide an optimum angle of incidence under just one operative condition). As such, it may be advantageous to fixedly position the guide vanes 156a on the guide plate 154 such that the vane angle α is held constant to achieve an optimum angle of incidence under one or more selected operating conditions, while avoiding stage performance degradation. In some examples, the vane angle(s) α can be selected such that the flow of pressurized fluid is guided from the outer inlet 128 toward the turbine wheel 102 at a particular velocity. For instance, when the guide vanes 156a are arranged having a relatively high vane angle α, the throat areas 186a-186f are relatively small. The throat areas 186a-186f function as nozzles to accelerate the fluid flow toward the turbine wheel 102.

The vane angle(s) α can also be selected to minimize any flow restriction and/or flow separation as the flow of fluid is guided from the outer volute 160 toward the turbine wheel 102. For example, when the guide vanes 156a are arranged having a relatively low vane angle α, the throat areas 186a-186f are relatively large (as compared to throat areas achieved with a relatively high vane angle). Fluid flowing through a relatively large throat area 186a-186f will experience less flow restriction than fluid flowing through a relatively small throat area. However, if the vane angle α is too high or too low, undesired flow characteristics may occur, resulting in inefficiencies. For example, undesired fluid separation at the guide vane surfaces can occur, and/or undesired flow restriction between the guide vanes can occur.

In some examples, the vane angle α is provided between about 30° and 80°. In some examples, the vane angle α is provided between about 40° and 70°. In some examples, the vane angle α is provided between about 50° and 60°. In some examples, the vane angle α can be different for one or more of the guide vanes as compared to one or more other guide vanes. For example, each guide vane can be arranged to have a unique vane angle relative to the vane angles of the other guide vanes. As another example, guide vanes in a first group of guide vanes can each be arranged at a first vane angle, and guide vanes in a second group of guide vanes can each be arranged at a second vane angle that is different from the first vane angle.

It is appreciated that the vane angle, or vane angles, can vary from operating environment to operating environment. For example, a first turbocharger including the turbine assembly 100 can be provided in a first engine system, and a second turbocharger including the turbine assembly 100 can be provided in a second engine system. The first engine system can have different operating characteristics than the second engine system. Consequently, the vane angle(s) in the first turbocharger can be defined to provide desired flow characteristics and efficiencies that are particular to the first engine system. The vane angle(s) in the second turbocharger can be defined to provide desired flow characteristics and efficiencies that are particular to the second engine system.

The fluid guide assembly 108 enables the efficient and cost-effective manufacture of turbochargers having different flow characteristics and customization for different operating environments. For example, a first fluid guide assembly 108 can be provided, which includes vane angle(s) that are desirable for a first operating environment. A second fluid guide assembly 108 can be provided, which includes vane angle(s) that are desirable for a second operating environment. A first turbine assembly 100 and a second turbine assembly 100 can be provided, can be generally of the same design. The first fluid guide assembly 108 can be assembled into the first turbine assembly 100 and the second fluid guide assembly 108 can be assembled into the second turbine assembly 100 to ultimately provide first and second turbochargers that are customized for first and second operating environments, respectively. As another example, guide vanes having different vane shapes can be used to provide turbochargers that are customized to particular operating environments. In these manners, fluid guide assembly 108 enables a common housing design to be used to provide customized flow characteristics.

Figure 7A:
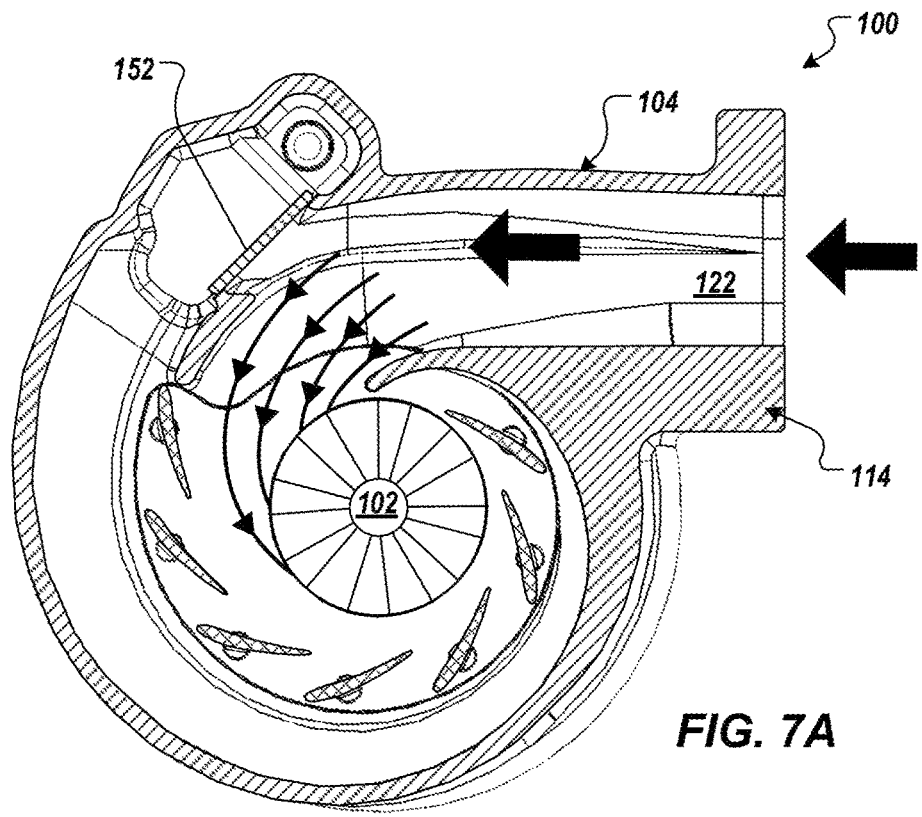
FIG. 7A is a cross-sectional view of the example turbine assembly of FIG. 1 depicting a first example fluid flow.
Figure 7B:
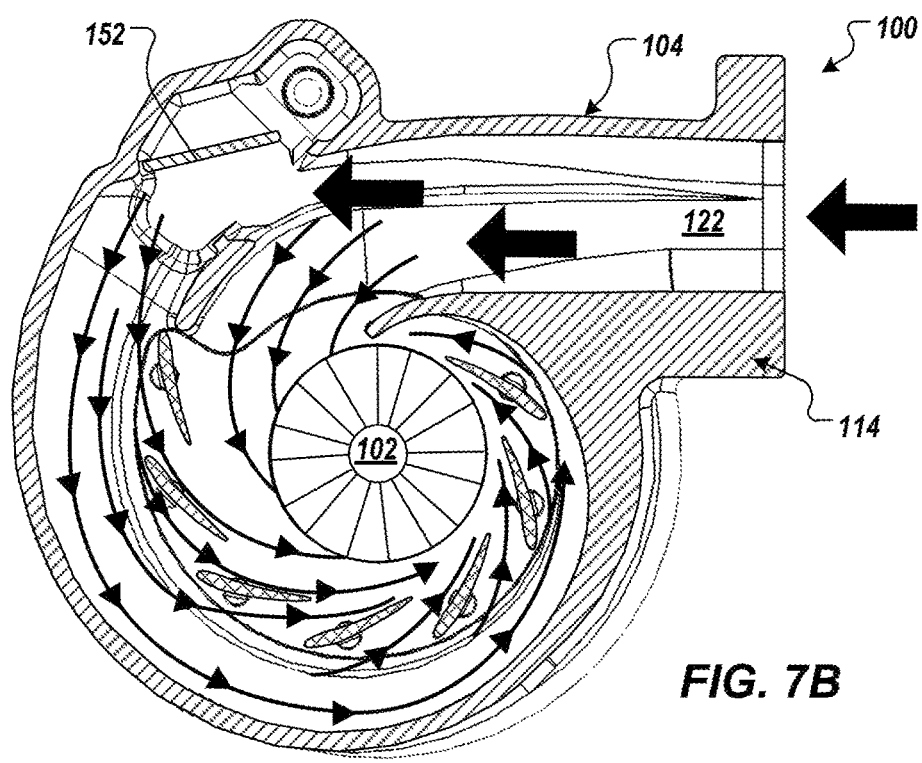
FIG. 7B is a cross-sectional view of the example turbine assembly of FIG. 1 depicting a second example fluid flow.

FIG. 7A is a cross-sectional view of the turbine assembly 100 illustrating an example flow of fluid through the body 104 and toward the turbine wheel 102 when the valve 106 is in a closed position. FIG. 7B is a cross-sectional view of the turbine assembly 100 illustrating an example flow of fluid through the body 104 and toward the turbine wheel 102 when the valve 106 is in an opened position.

The turbine assembly 100 can be designed to provide peak efficiency of the corresponding turbocharger at specific parameters. Example parameters can include the position of the gate 152 and vane angle α. In some implementations, peak efficiency of the corresponding turbocharger can be provided with a vane angle of approximately 60° and a gate position of approximately 80% open. In some implementations, peak efficiency of the corresponding turbocharger can be provided with a vane angle of approximately 55° and a gate position of approximately 80% open. In some implementations, peak efficiency of the corresponding turbocharger can be provided with a vane angle of approximately 50° and a gate position of approximately 100% open.

Figure 8:
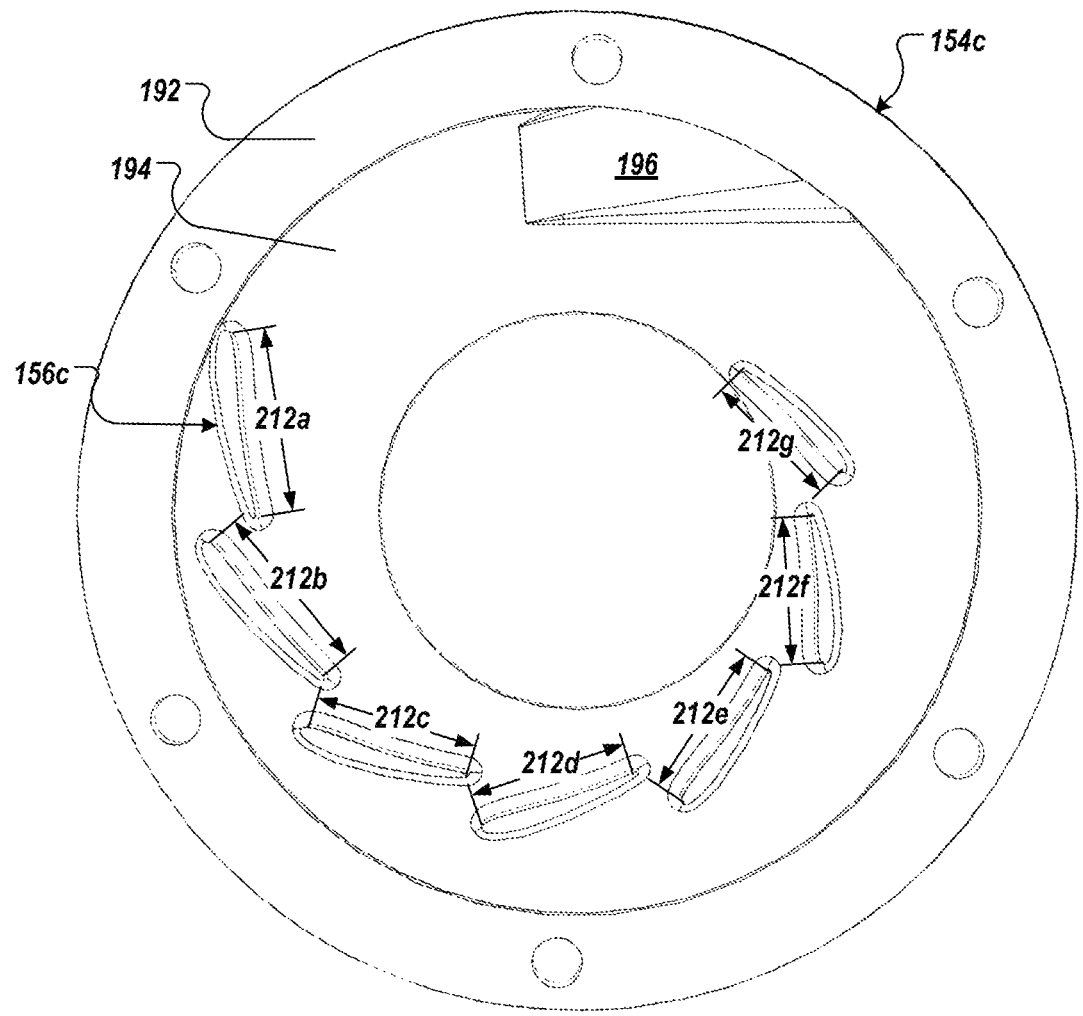
FIG. 8 is a plan view of an example modular guide plate.
Figure 9A:
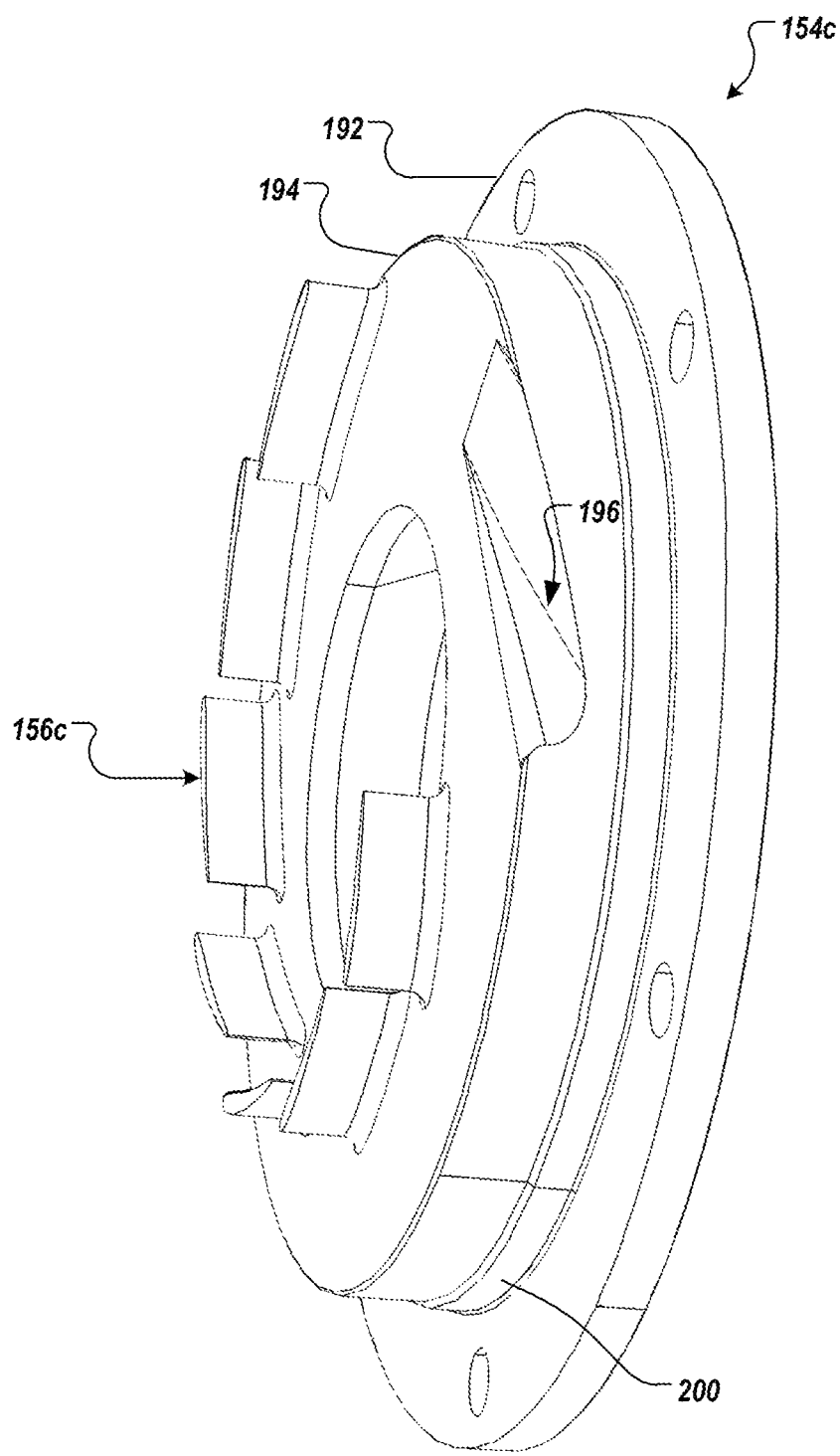
FIG. 9A is a front perspective view of the modular guide plate of FIG. 8.
Figure 9B:
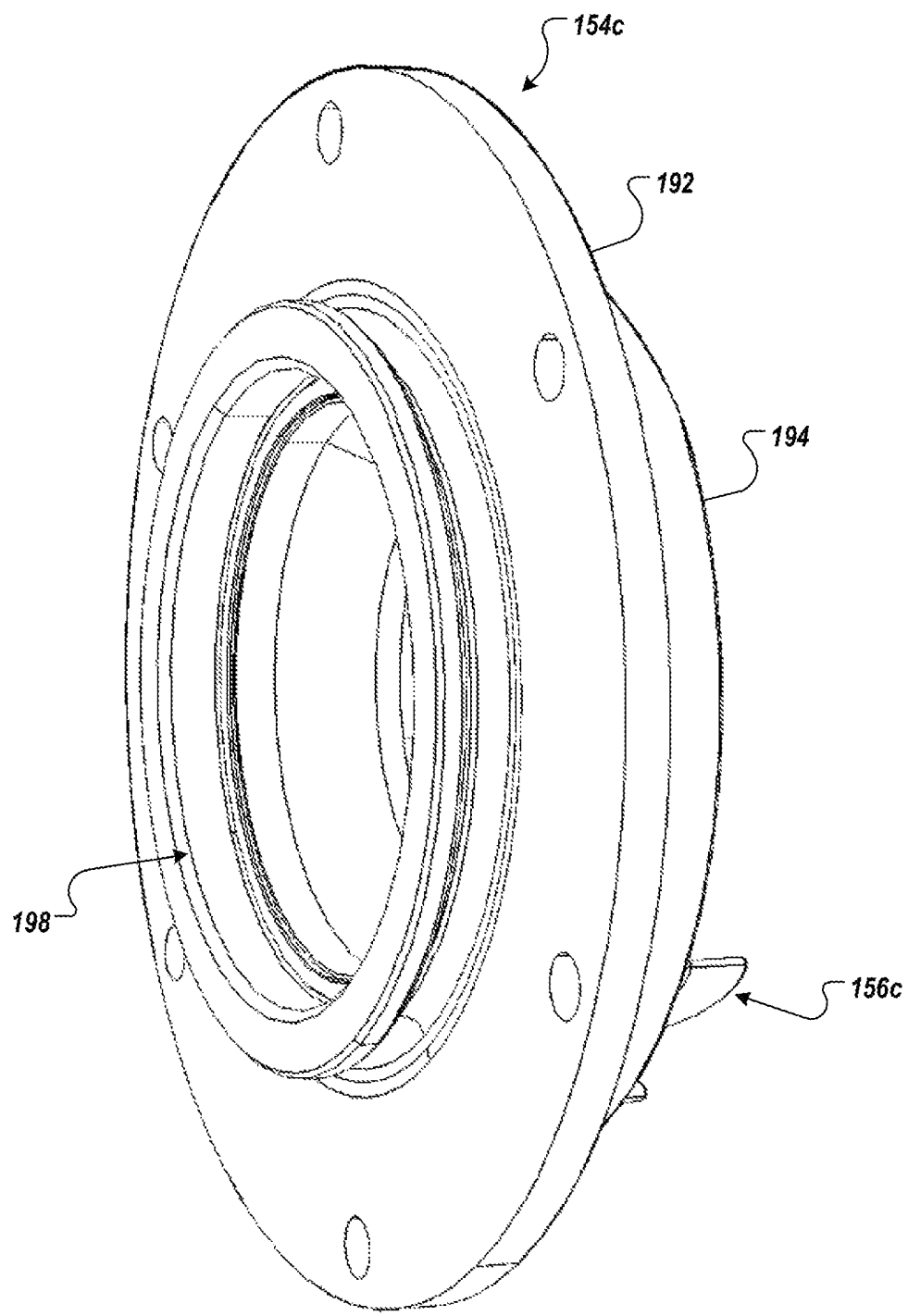
FIG. 9B is a rear perspective view of the modular guide plate of FIG. 8.

FIGS. 8 and 9A-9B are plan and perspective views of an example modular guide plate 154c including the guide vanes 156c. In this example, the guide vanes 156c are integrally formed with the modular guide plate 154c. As shown, the modular guide plate 154c includes a mounting flange 192 for securing the modular guide plate 154c to the body 104. The modular guide plate 154c also includes a surface 194 extending from the mounting flange 192 and terminating in a substantially flat face, on which the guide vanes 156c are formed. In this example, a sloped groove 196 is provided and is positioned near an outer, circumferential edge of the surface 194. The groove 196 can be configured to affect the incoming fluid flow through the fluid inlet 114. For example, the groove 196 can help guide fluid entering the fluid inlet 114 into the inner volute 158.

In some examples, the modular guide plate 154c provides a coupling element for joining the body 104 to a suitable bearing housing (not shown). For example, the modular guide plate 154c includes connection features 198 extending outward from the flange 192. In this example, the connection features 198 are provided to accept standard v-band couplings, however, other arrangements (e.g., bolted connections) can also be provided.

Figure 10:
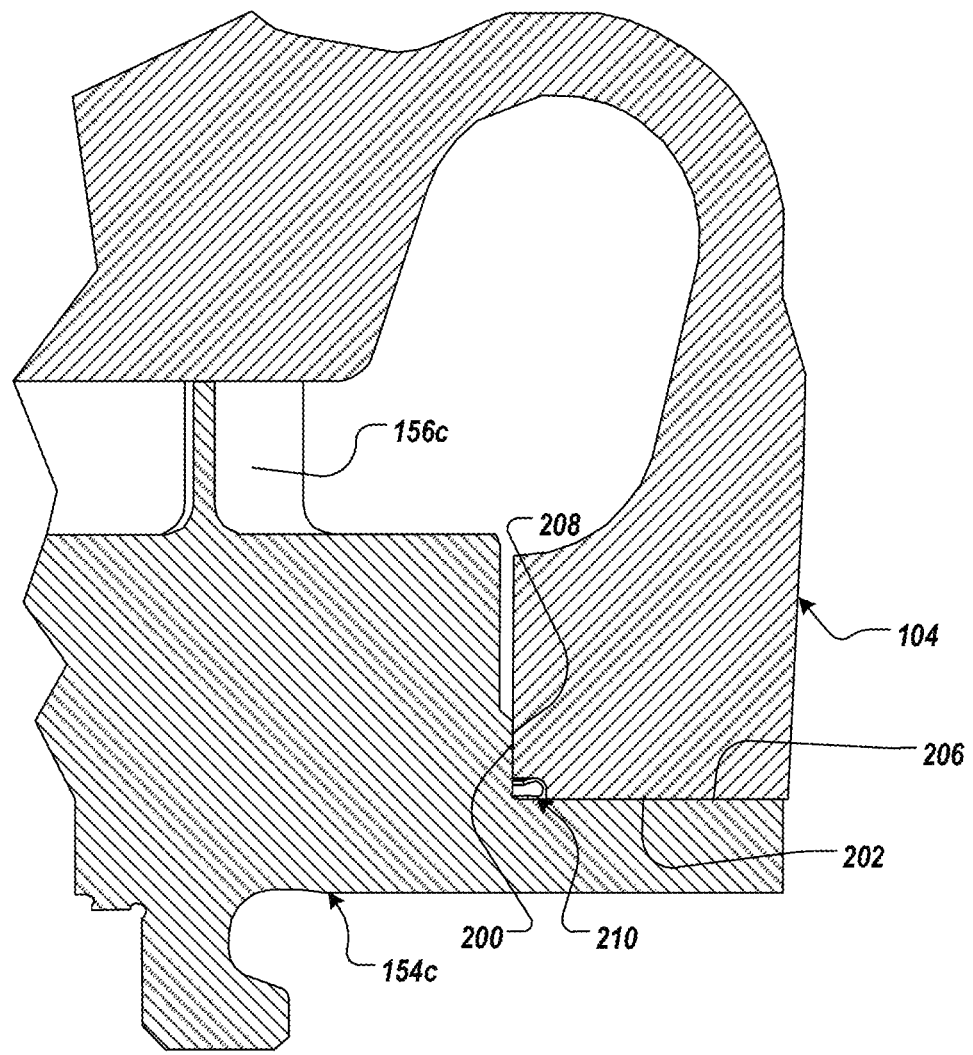
FIG. 10 is a cross-sectional view of the modular guide plate of FIG. 8 disposed within the turbine assembly of FIG. 1.

In some implementations, the modular guide plate 154c can serve as a sealing element for the turbine assembly 100. For example, the modular guide plate 154c can include a sealing surface 200 (see FIG. 9A). FIG. 10 is a cross-sectional view of the modular guide plate 154c assembled in a sealed relationship with the body 104. As shown, a sealing surface 202 of the mounting flange 192 abuts a mating sealing surface 206 of the body 104. Another sealing surface 208 of the body 104 abuts the sealing surface 200. In some implementations, a sealing member 210 can be assembled between the modular guide plate 154c and the body 104 to maintain a substantially fluid tight seal therebetween. For instance, in this example, the sealing member is provided in the form of an annular sealing ring (e.g., a c-seal).

Referring again to FIGS. 8, 9A, and 9B, the guide vanes 156c can be arranged in a selected configuration to achieve desired fluid flow characteristics (as discussed in detail above). The geometry of the guide vanes 156c (e.g., the trailing edge, the leading edge, the inner and outer bearing surfaces) can also be designed for the same purposes. In some examples, each of the guide vanes 156c can be provided with a respective geometry. For example, each of the guide vanes 156 can include a different effective length 212a-212g (e.g., the distance between the leading edge and the trailing edge of the guide vane body). More specifically, and in some examples, the effective lengths of the guide vanes 156c decreases moving from the first guide vane 156c to the last guide vane 156c in the direction of fluid flow. In some examples, the decrease in effective length can be between about 1% and 15% (e.g., between about 2% and 8%) for each subsequent guide vane. For example, the effective length 212b can be between about 1% and 15% shorter than the effective length 212a. Providing guide vanes with progressively decreasing effective lengths can reduce or inhibit flow distortion. For example, decreasing the effective lengths of the guide vanes can help inhibit flow distortions that may develop due to a continuously decreasing turning radius (sharper turn) as the gas progresses through the logarithmic scrolling flow path. The progressively shorter vanes have inherently smaller camber radii which match the tightening turning radius of the gas flow. The progressively shorter vanes can also accommodate packaging constraints (for example, by providing a vane scroll that fits into the internal space 122 of the body 104).

As noted above, the spatial relationship between the trailing edge of one guide vane and the leading edge of a subsequent guide vane can affect fluid flow between the inner and outer volutes. These relationships can be described in terms of the throat area and/or the overlap area between successive guide vanes. In some implementations, such relationships can be defined individually, such that each throat or overlap area is established having a size that is different from other throat or overlap areas. For instance, in the example depicted in FIG. 8, the overlap, and consequently, the throat areas, defined between neighboring guide vanes decreases from the most upstream guide vane to the most downstream guide vase. By independently defining the spatial relationship between neighboring guide vanes changes in fluid flow around the inner and outer volutes can be accounted for.

In some implementations, the modular guide plate 154c can include a combination of fluid guiding components (e.g., the guide vanes 156c) which may otherwise be incorporated separately. Configuring the modular guide plate 154c in this manner provides a single element installed within common hardware (e.g., the body 104) that can alter turbocharger performance (e.g., flow capacity, efficiency map shifts, etc.). In some examples, different modular guide plates can be provided, each of the modular guide plates being configured to achieve selected flow characteristics (for example, by having a specific guide vane arrangement). As such, a turbocharger can be tuned to specific engine parameters by installing a modular guide plate having a first configuration instead of a second modular guide plate having a second configuration that is different from the first configuration.

Figure 11A:
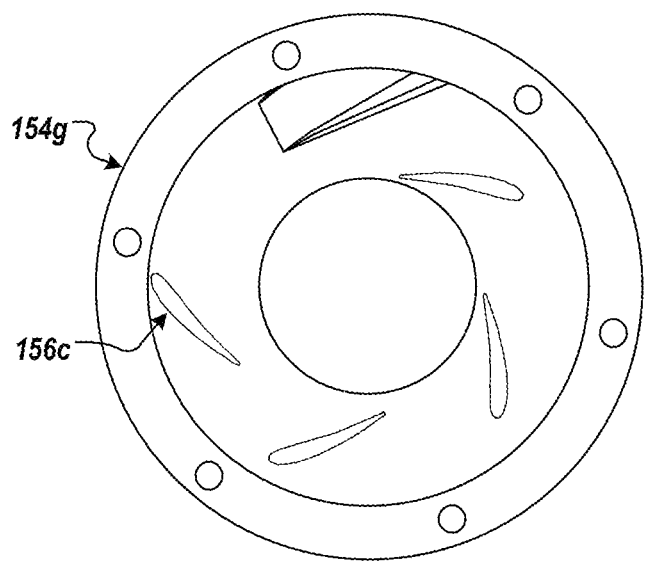
FIG. 11A is a plan view of an example modular guide plate including guide vanes arranged in an logarithmic scroll arrangement.

As described in detail above, the geometry and arrangement (e.g., vane angle) of the guide vanes 156a, 156b, 156c can determine various fluid flow characteristics. Certain fluid flow characteristics can also be affected by the number vanes provided in the scroll configuration. FIG. 11A is a plan view of an example guide plate 154g including four guide vanes 156c arranged in a logarithmic scroll arrangement. As shown, due to the relatively low number of guide vanes 156c, the throat areas between the guide vanes 156c are relatively large. The large throat areas can allow for a relatively large flow capacity, offering little flow restriction. In some cases, however, inefficiencies can result from the step change in fluid flow between the outer volute and the inner volute at each of the throat areas.

Figure 11B:
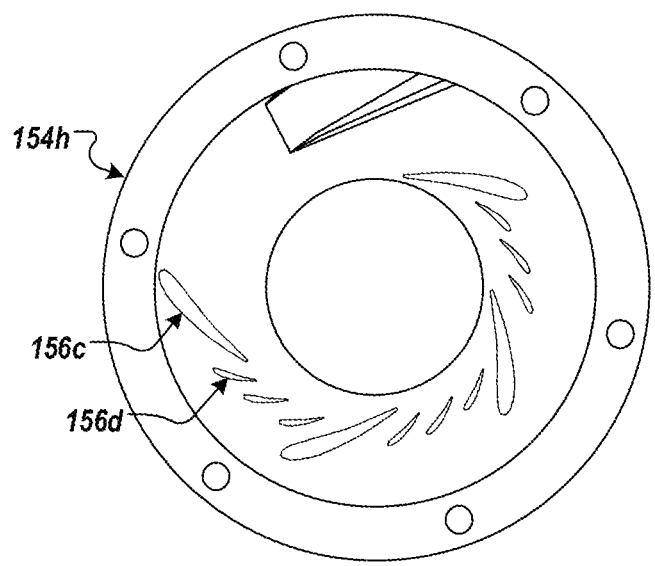
FIG. 11B is a plan view of an example modular guide plate including guide vanes and splitter vanes.

FIG. 11B is a front view of an example guide plate 154h carrying a scroll arrangement of guide vanes 156c that is similar to that of the guide plate 154g. The guide plate 154h, however, further includes a plurality of splitter vanes 156d. In the depicted example three splitter vanes 156d are provided between guide vanes 156c. It is appreciated, however, that other appropriate numbers of splitter vanes, e.g., one or more, can be provided between adjacent guide vanes. Each splitter vane 156d can have a geometry similar to guide vanes 156c. The geometry of the splitter vanes 156d can also be different from the guide vanes 156c. In some examples, the addition of splitter vanes 156d can smooth out the merging of fluid flow between outer volute and the inner volute at the cost of an increase in flow restriction. Further, although in this example the splitter vanes 156d are disposed in each of the throat areas between the guide vanes 156c, other arrangements are also possible. For example, in some implementations, the splitter vanes 156d can be disposed between just one or two of the throat areas.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A turbine housing for a turbocharger, the housing comprising:
    a body that defines an inlet for fluid communication with a fluid source, and a wall, the wall dividing the inlet into an inner inlet and an outer inlet; and
    a fluid guide assembly disposed within the housing, the fluid guide assembly comprising a plurality of vanes that demarcate an inner volute and an outer volute within the housing, the inner volute being in fluid communication with the inner inlet and the outer volute being in fluid communication with the outer inlet, each vane of the plurality of vanes being radially fixed at a respective angle relative to a turbine wheel within the housing to form respective overlap areas between adjacent vanes, each of the respective overlap areas defining a throat having a length sufficient to inhibit crosstalk between the inner and outer volutes as the plurality of vanes guide fluid flow from the outer volute to the inner volute, respective effective lengths of the plurality of vanes progressively decreasing proportional with a decrease in throat radii such that at least one of the respective overlap areas defining a first throat, corresponding to a first vane, is larger than at least one other overlap area defining a second throat corresponding to a second vane that is smaller than the first vane.

2. The turbine housing of claim 1, wherein the fluid guide assembly further comprises a guide plate that is secured to the body, the plurality of vanes being secured to the guide plate.

3. The turbine housing of claim 1, wherein at least one of the vanes is radially fixed at an angle between approximately 30° and approximately 80°.

4. The turbine housing of claim 1, wherein at least one of the vanes is radially fixed at an angle between approximately 40° and approximately 70°.

5. The turbine housing of claim 1, wherein at least one of the vanes is radially fixed at an angle between approximately 50° and 60°.

6. The turbine housing of claim 1, wherein each of the vanes is radially fixed at the same angle.

7. The turbine housing of claim 1, wherein a first of the vanes is radially fixed at a first angle, and wherein at least one other vane is radially fixed at a second angle that is different from the first angle.

8. The turbine housing of claim 1, wherein the respective angle of each vane is measured from a radial line that runs through a center point of the turbine wheel and a center point of the vane, and a line that runs through the center point of the vane and a trailing edge of the vane.

9. The turbine housing of claim 1, wherein the vanes are positioned to provide an angle of incidence of fluid flow relative to the turbine wheel.

10. The turbine housing of claim 9, wherein the angle of incidence is at most approximately 10°.

11. The turbine housing of claim 1, further comprising a valve assembly for regulating fluid communication between the outer inlet and the outer volute, the valve assembly comprising a gate that is movable between a fully closed position to inhibit fluid flow through the outer inlet, and a fully opened position to enable fluid flow through the outer inlet.

12. A turbocharger, comprising:
    a turbine housing comprising:
        a body that defines an inlet for fluid communication with a fluid source, and a wall, the wall dividing the inlet into an inner inlet and an outer inlet; and
        a fluid guide assembly disposed within the housing, the fluid guide assembly comprising a plurality of vanes that demarcate an inner volute and an outer volute within the housing, the inner volute being in fluid communication with the inner inlet and the outer volute being in fluid communication with the outer inlet, each vane of the plurality of vanes being radially fixed at a respective angle relative to a turbine wheel within the housing to form respective overlap areas between adjacent vanes, each of the respective overlap areas defining a throat having a length sufficient to inhibit crosstalk between the inner and outer volutes as the plurality of vanes guide fluid flow from the outer volute to the inner volute, respective effective lengths of the plurality of vanes progressively decreasing proportional with a decrease in throat radii such that at least one of the respective overlap areas defining a first throat, corresponding to a first vane, is larger than at least one other overlap area defining a second throat corresponding to a second vane that is smaller than the first vane.

13. The turbocharger of claim 12, wherein the fluid guide assembly further comprises a guide plate that is secured to the body, the plurality of vanes being secured to the guide plate.

14. The turbocharger of claim 12, wherein at least one of the vanes is radially fixed at an angle between approximately 30° and approximately 80°.

15. The turbocharger of claim 12, wherein at least one of the vanes is radially fixed at an angle between approximately 40° and approximately 70°.

16. The turbocharger of claim 12, wherein at least one of the vanes is radially fixed at an angle between approximately 50° and 60°.

17. The turbocharger of claim 12, wherein each of the vanes is radially fixed at the same angle.

18. A method of manufacturing a turbine housing for a turbocharger, the method comprising:
   forming a body, the body defining an inlet for fluid communication with a fluid source, and a wall, the wall dividing the inlet into an inner inlet and an outer inlet;
   assembling a fluid guide assembly, the fluid guide assembly comprising a plurality of vanes; and
   securing the fluid guide assembly within the body such that the plurality of vanes demarcate an inner volute and an outer volute within the housing, the inner volute being in fluid communication with the inner inlet, and the outer volute being in fluid communication with the outer inlet, each vane of the plurality of vanes being radially fixed at a respective angle relative to a turbine wheel within the housing to form respective overlap areas between adjacent vanes, each of the respective overlap areas defining a throat having a length sufficient to inhibit crosstalk between the inner and outer volutes as the plurality of vanes guide fluid flow from the outer volute to the inner volute, respective effective lengths of the plurality of vanes progressively decreasing proportional with a decrease in throat radii such that at least one of the respective overlap areas defining a first throat, corresponding to a first vane, is larger than at least one other overlap area defining a second throat corresponding to a second vane that is smaller than the first vane.

\* \* \* \* \*